Figure 8:
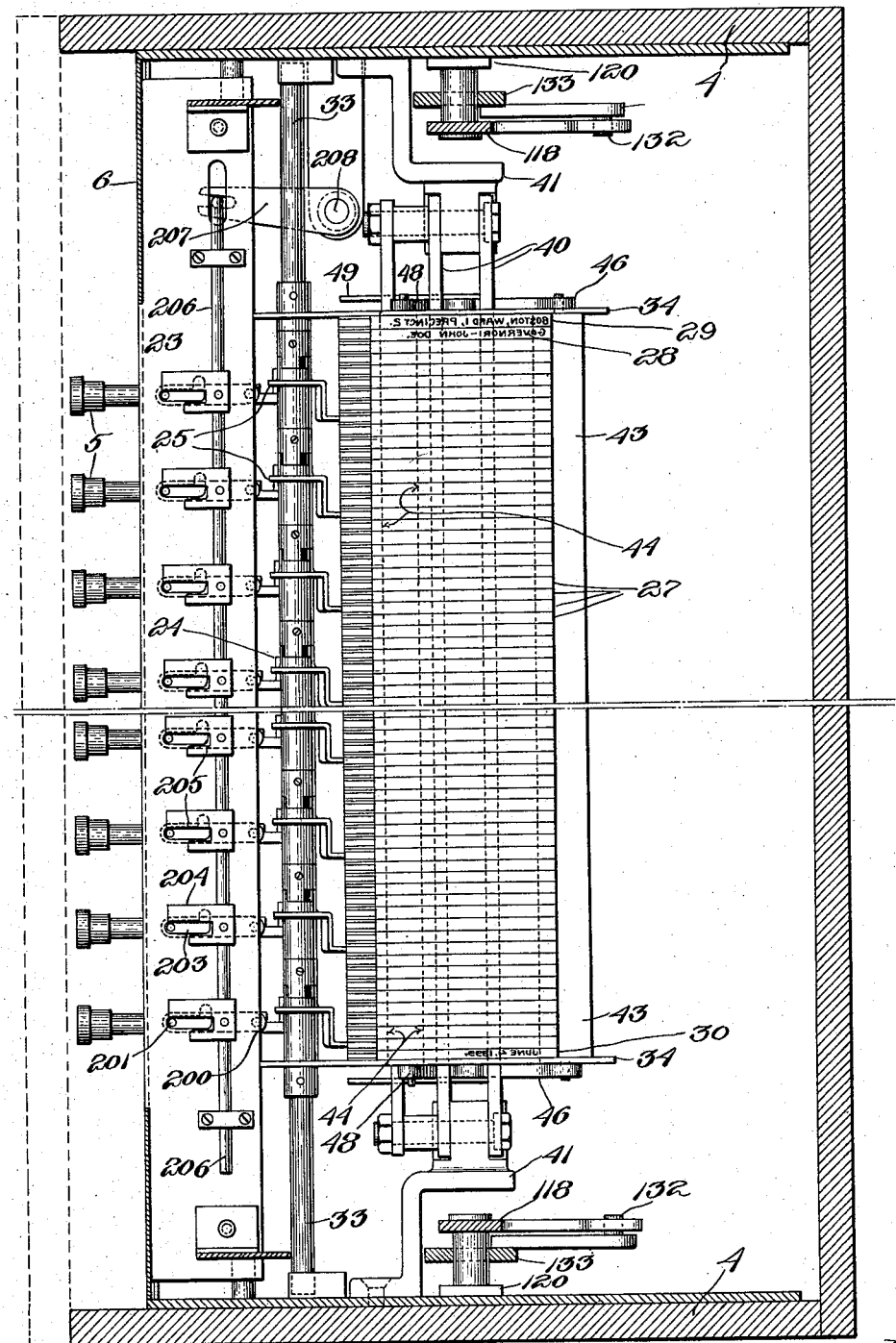

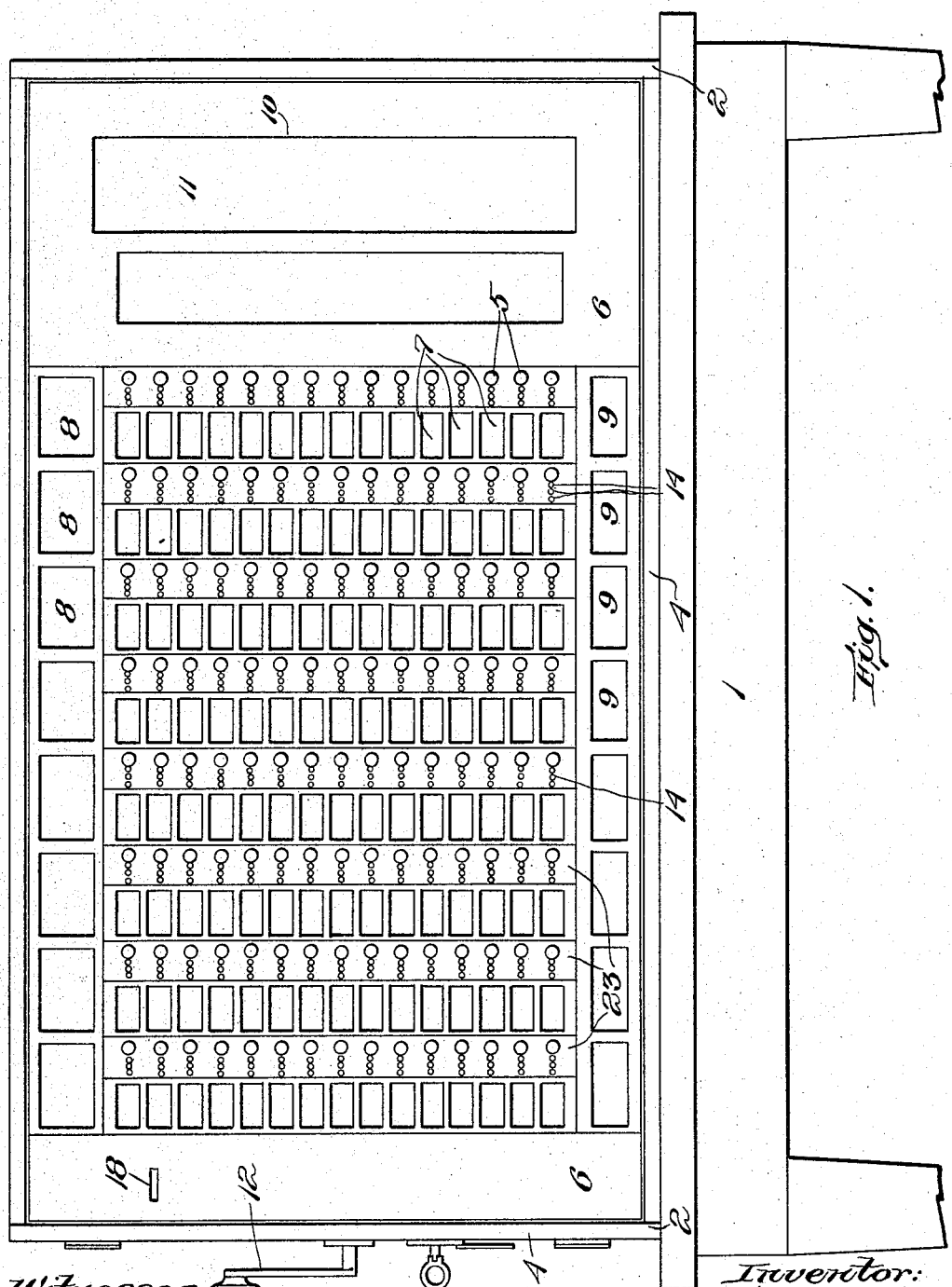

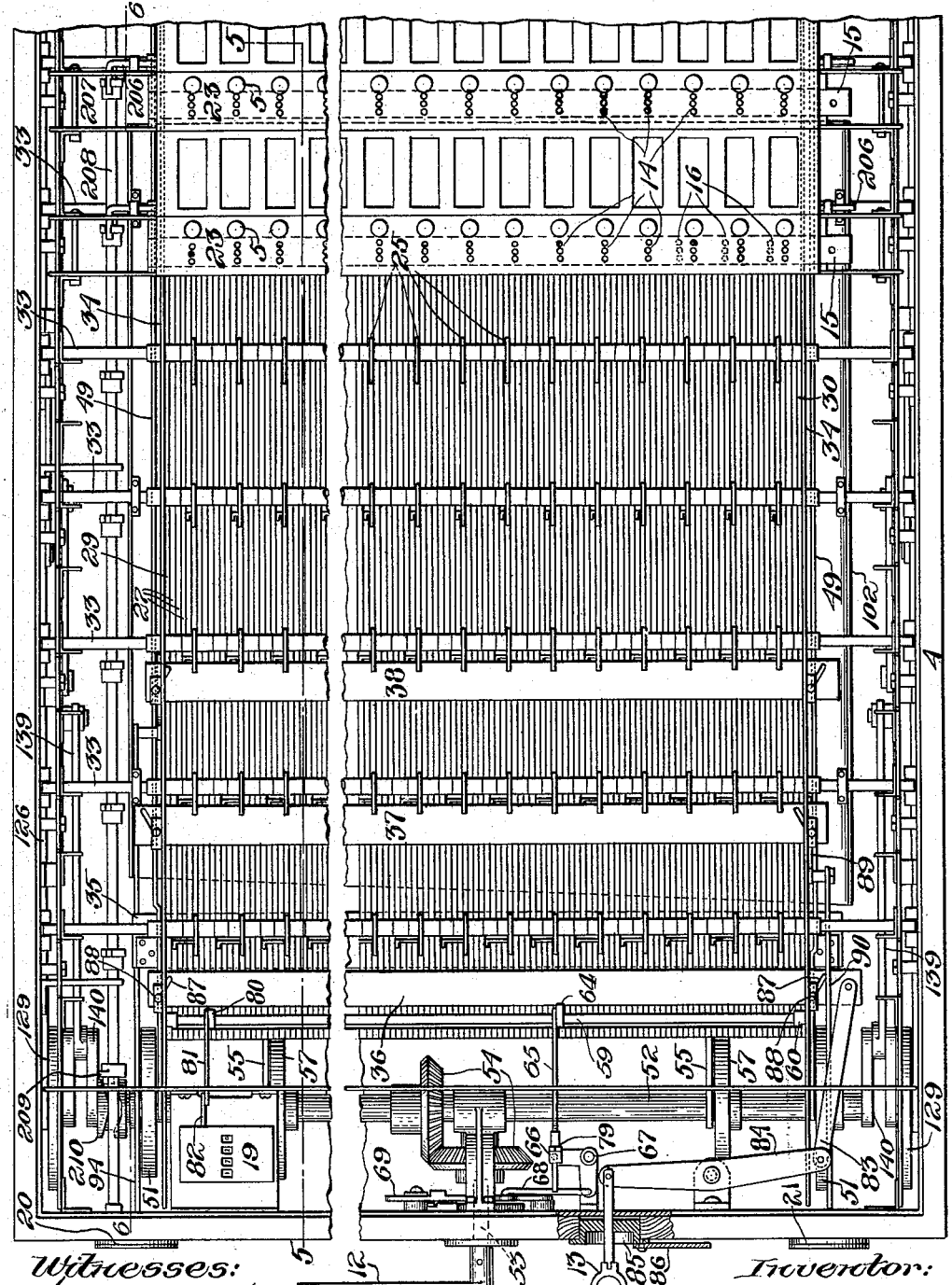

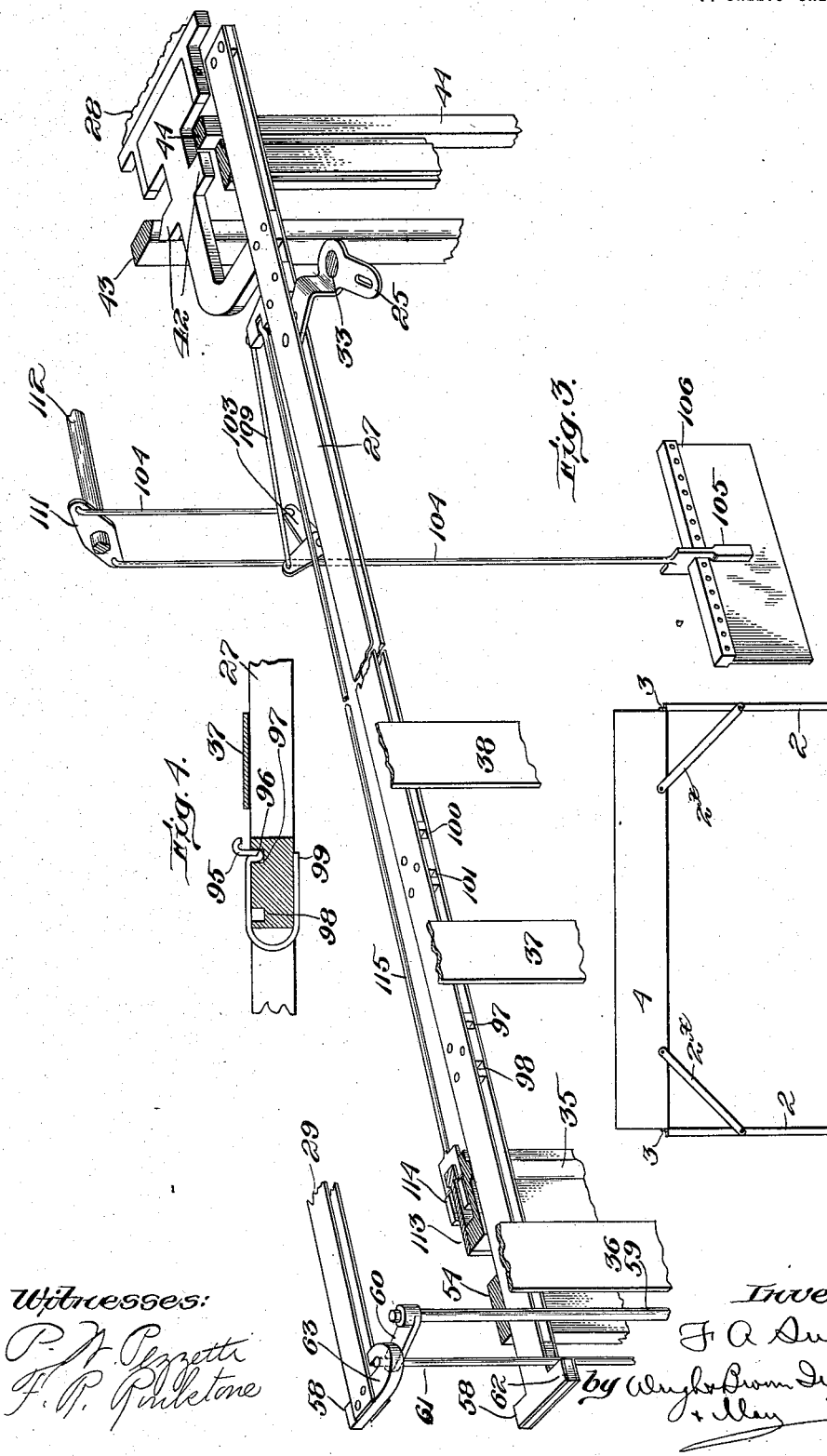

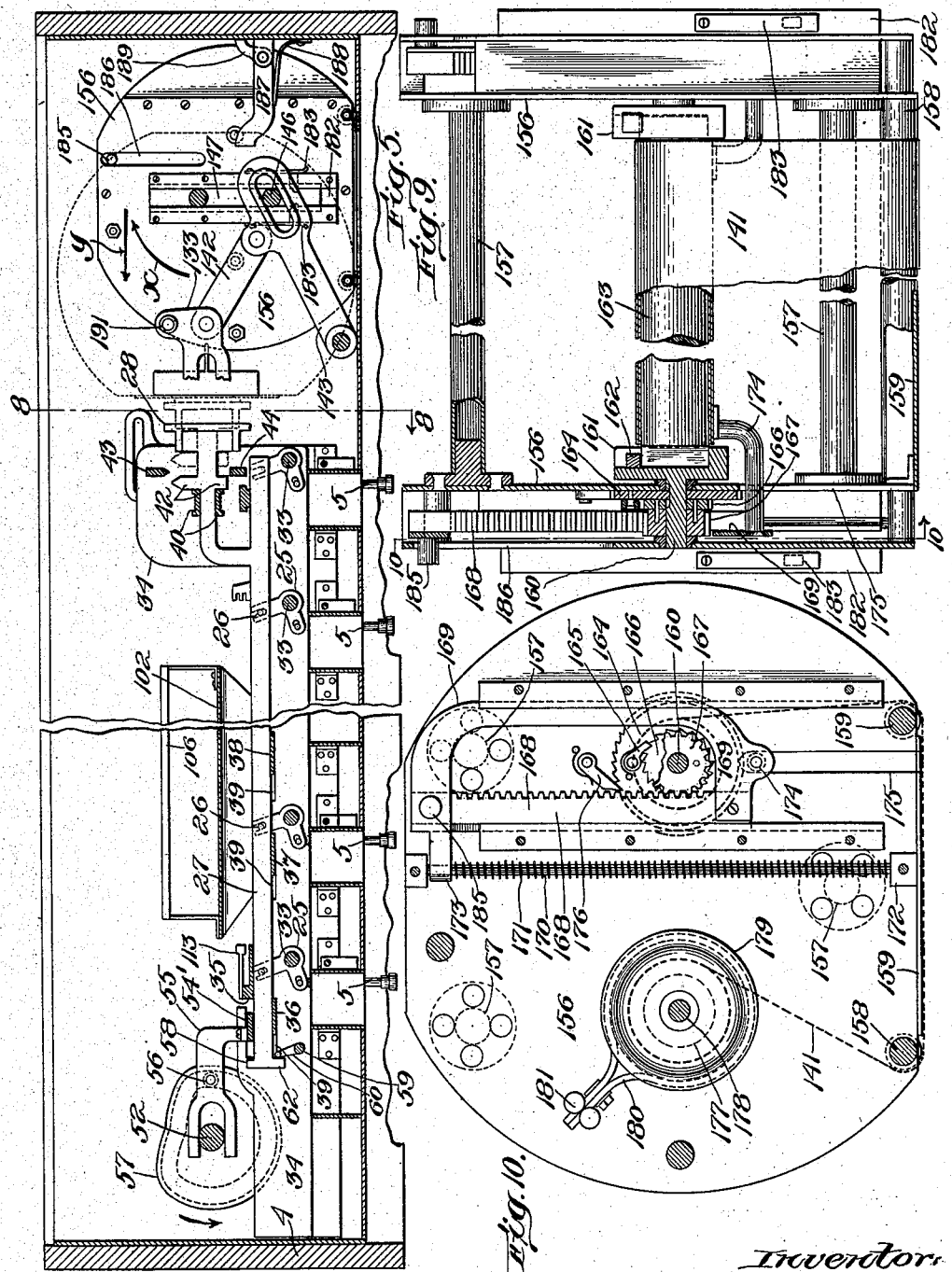

F. A. SUCK.
VOTING MACHINE.
APPLICATION FILED OCT. 4, 1909.
1,145,817.
Patented July 6, 1915.
11 SHEETS—SHEET 5.
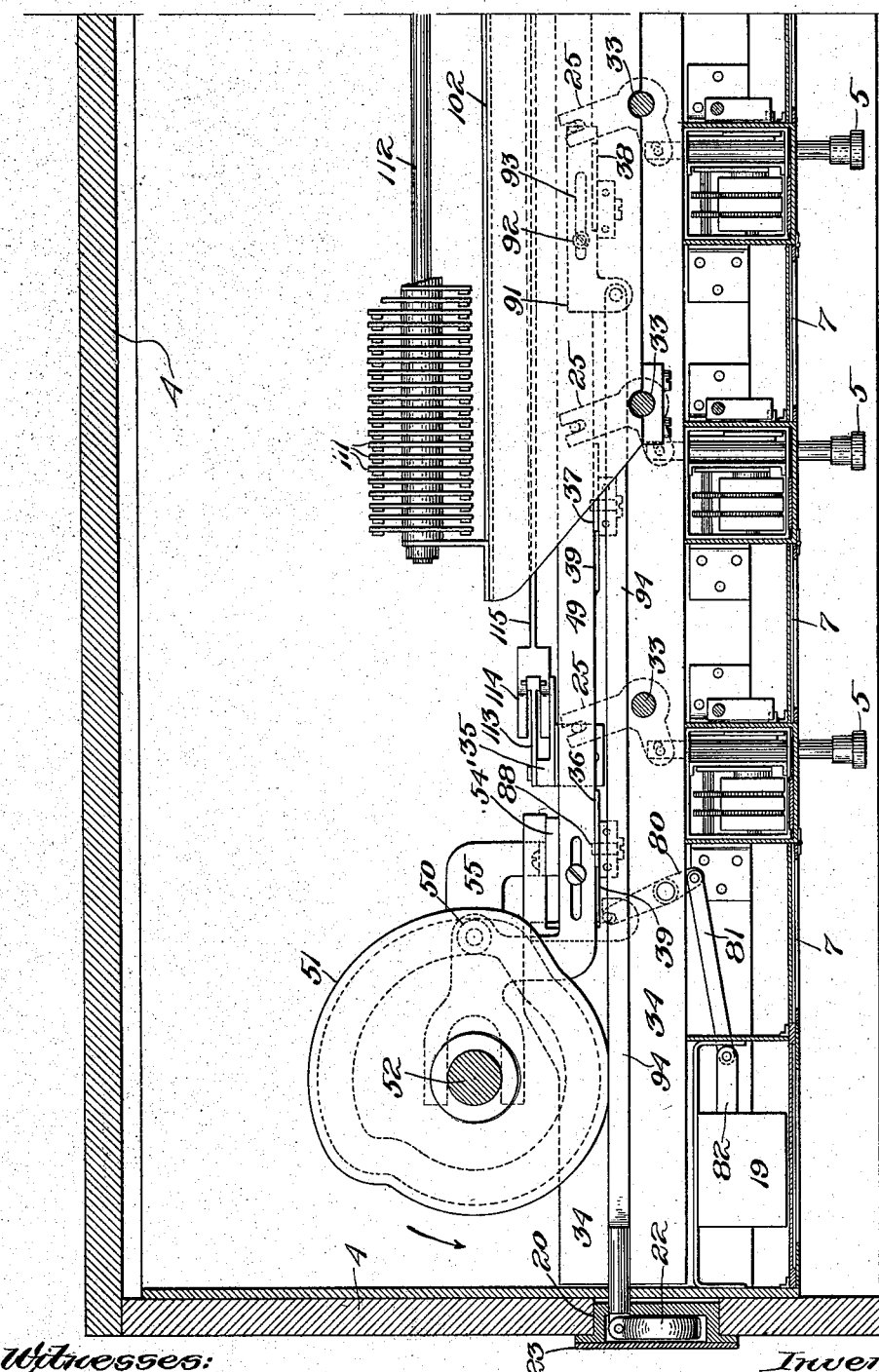

F. A. SUCK.
VOTING MACHINE.
APPLICATION FILED OCT. 4, 1909.
1,145,817.
Patented July 6, 1915.
11 SHEETS—SHEET 6.
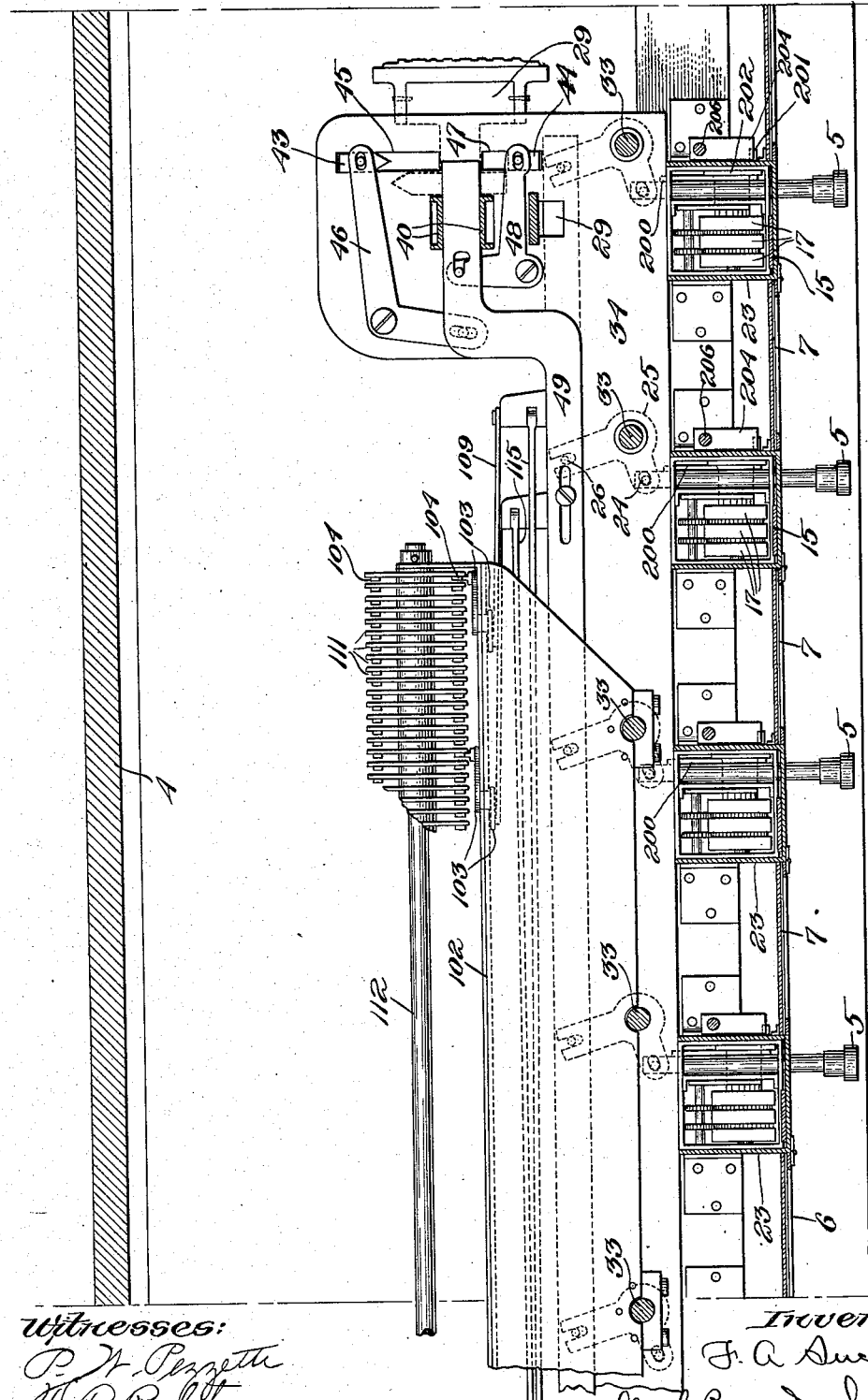

F. A. SUCK.
VOTING MACHINE.
APPLICATION FILED OCT. 4, 1909.
1,145,817.
Patented July 6, 1915.
11 SHEETS—SHEET 8.
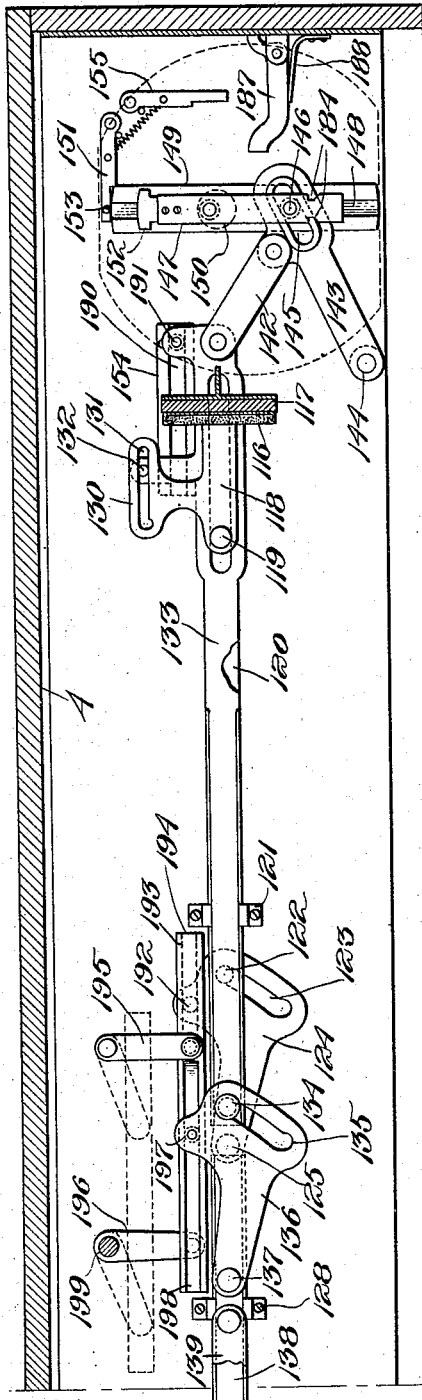
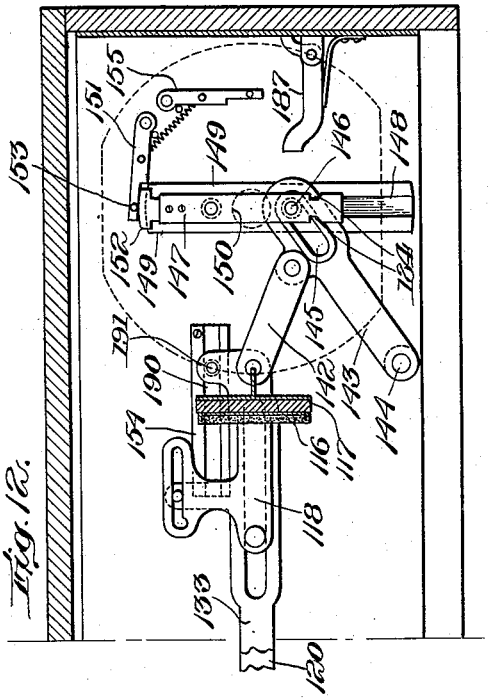
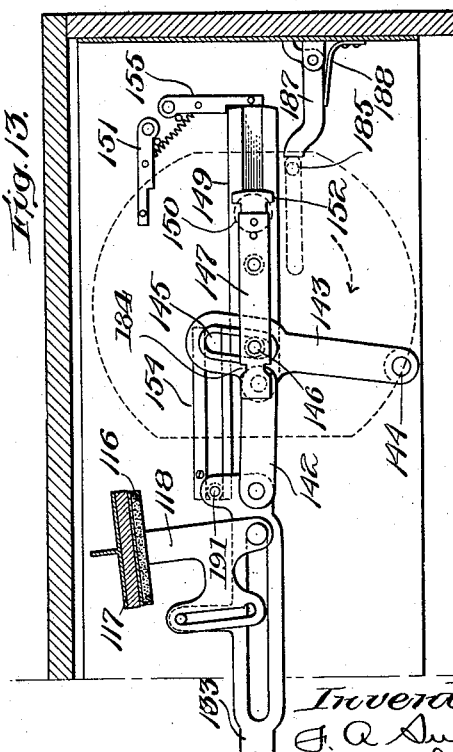

F. A. SUCK.
VOTING MACHINE.
APPLICATION FILED OCT. 4, 1909.
1,145,817.
Patented July 6, 1915.
11 SHEETS—SHEET 9.
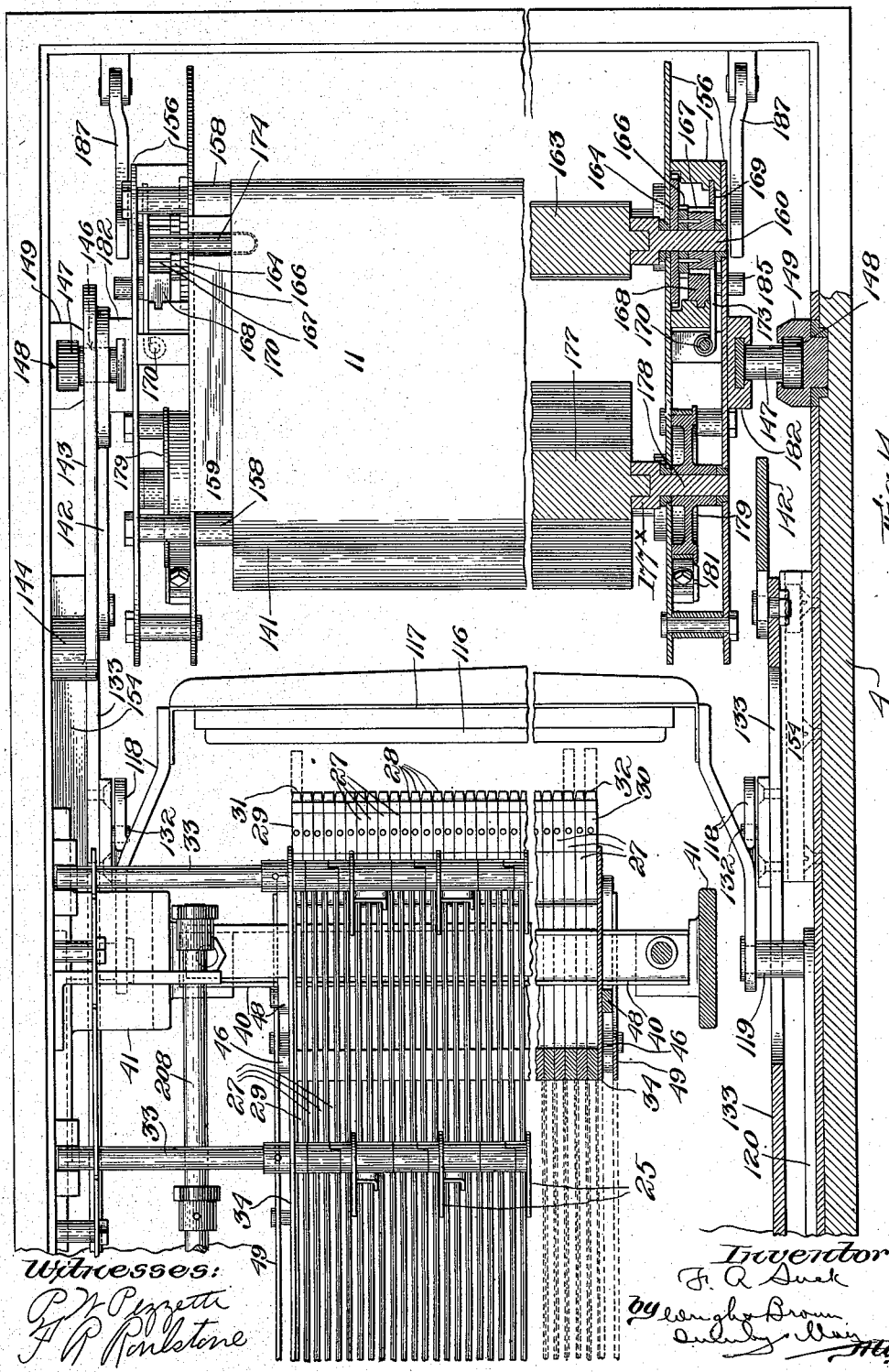

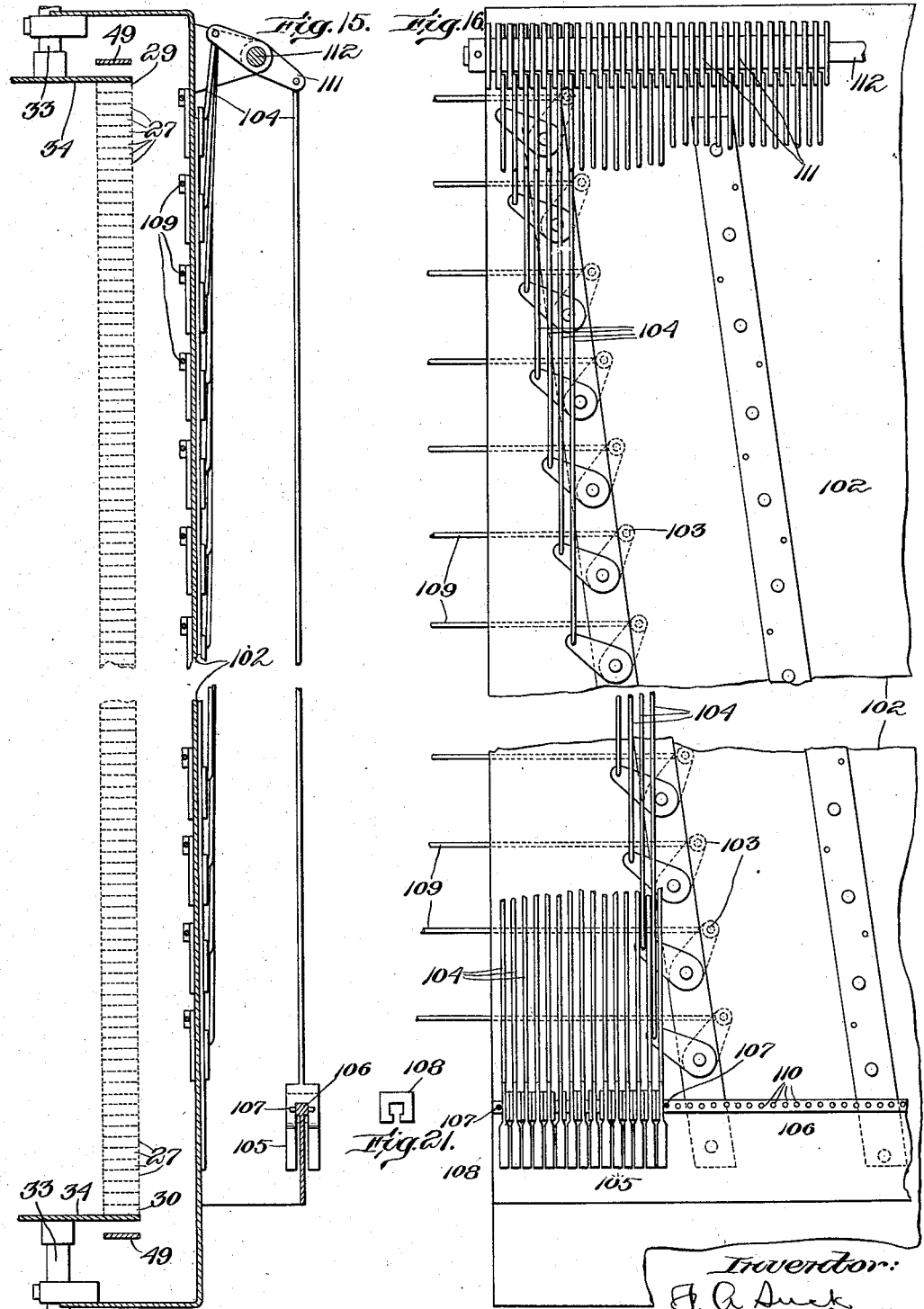

F. A. SUCK.
VOTING MACHINE.
APPLICATION FILED OCT. 4, 1909.
1,145,817.
Patented July 6, 1915.
11 SHEETS—SHEET 11.
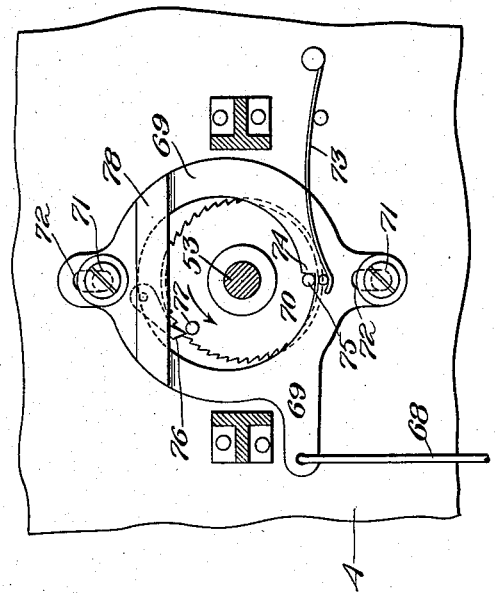
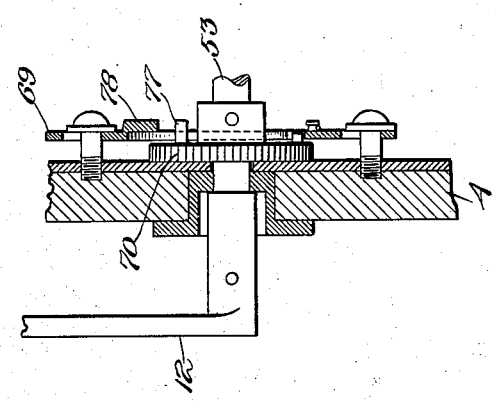

UNITED STATES PATENT OFFICE.

FREDERICK A. SUCK, OF BOSTON, MASSACHUSETTS.

VOTING-MACHINE.

1,145,817. Specification of Letters Patent. Patented July 6, 1915.

Application filed October 4, 1909. Serial No. 520,972.

*To all whom it may concern:*

Be it known that I, FREDERICK A. SUCK, of Boston, in the county of Suffolk and State of Massachusetts, have invented certain new and useful Improvements in Voting-Machines, of which the following is a specification.

This invention relates to voting machines and has for its object to provide an improved machine of this class which will meet all the requirements of the election laws and of general use.

To these ends my invention consists in the novel features of construction and mode of operation hereinafter set forth in the following description, and particularly pointed out in the claims at the close thereof.

In the accompanying drawings, Figure 1 is a front elevation of a voting machine constructed in accordance with my invention. Fig. 2 is a view similar to Fig. 1 but on a larger scale, with parts removed and broken away for purposes of illustration. Fig. 3 is a perspective view of one of the type bars, hereinafter described, together with some other parts that coöperate therewith. Fig. 4 is a detail hereinafter described. Fig. 5 is a sectional plan view on the line 5—5 of Fig. 2, with some parts broken away and removed for clearness. Figs. 6 and 7 placed end to end make up a sectional plan view on the line 6—6 of Fig. 2. Fig. 8 is a vertical section on the line 8—8 of Fig. 5. Fig. 9 is a broken side view of the carrier for the ballot strip and platen, hereinafter described. Fig. 10 is a section on the line 10—10 of Fig. 9. Figs. 11, 12 and 13 are sectional plan views illustrating the operation of the carrier for the ballot strip and platen, and of the inking pad hereinafter described. Fig. 14 is a sectional elevation of the right hand end of the machine shown in Fig. 1 with parts broken away and removed for purposes of illustration. Figs. 15 and 16 relate to the controlling means for limiting the number of votes cast. Fig. 17 relates to the actuating devices for the ink pad and carrier for the ballot strip and platen. Figs. 18, 19, 20 and 21 are hereinafter described.

My improved voting machine herein shown is a portable oblong box-like affair, small and light, so that it can be easily transported. When in use it is placed upon any suitable support such as the table 1 shown in Fig. 1 with its front doors or covers 2 opened into perpendicular relation to the main body of the machine so as to form a booth, as shown in Figs. 1 and 20, within which the voter stands while casting his ballot. The two doors 2 are hinged at 3 to the body 4 of the machine and links $2^x$ are provided to hold the doors in their open perpendicular position. The front of the machine presents to the voter a bank of push buttons or voting keys 5, arranged in eight vertical rows of fifteen keys each, the keys of the several vertical rows being arranged in fifteen horizontal rows. At the left of each key 5 there is provided in the face or front wall 6 of the machine, a receptacle 7 to hold exposed a card bearing the name and office of a candidate while above each vertical row of keys is provided a similar receptacle 8 to hold exposed a card bearing the party name, as Republican, Democrat, etc., for which the candidates of the vertical rows are nominated. The card receptacles 9 below the vertical rows of keys are for instructions, such as "Vote for one" or the like. Near the right hand end of the machine is an opening 10 in the face plate 6 that is closed by a section of paper 11 which is the blank for the ballot that the voter is to write and cast.

In those cases where all of the candidates are represented by the voting keys 5, then the voter upon entering the booth simply pushes in the keys opposite which are the names of the candidates of his choice and passes out. The pushing in of the keys 5 by the voter acts to free a normally locked crank 12 which is turned by the officer in charge of the machine to the extent of one revolution as the voter passes out of the booth. This operation of handle 12 acts to shift the section of paper 11 away from opening 10; to print or otherwise impress on said section 11 the vote cast in accordance with the keys 5 that have been operated by the voter; to feed a fresh ballot section 11 into position at the opening 10 and to restore the machine to normal condition ready for the next voter. The handle 12 is automatically controlled so that it cannot be operated to make more than one impression of each ballot.

Alongside of each voting key 5 are provided three openings 14 in face plate 6 and these openings are normally closed by vertical slides 15, Figs. 2 and 7, provided with corresponding sets of openings 16 normally out of register with the openings 14. These slides are intended to be shifted by hand when the votes are being copied or transcribed so that the holes 14 and 16 are caused to register and expose the wheels of the counters 17, one of the latter being controlled by each key 5 and being operated in a manner to be described later so as to register the total number of times its respective key is operated, or in other words, to register the total number of votes cast for the candidate whose name is on the card in the receptacle 9 opposite its key.

Near the upper left hand corner of the machine, Fig. 1, there is an opening 18 in face plate 6 through which is visible a counter 19, Fig. 2. This counter 19 registers, as more fully described later, the total number of ballots cast. In the left hand end wall of frame 4 are provided two pockets 20 and 21, Figs. 2 and 6, and within each of said pockets is a handle 22 which can be reached by swinging aside a pivoted cover 23. These handles control vote-restricting devices and when occupying retracted positions within pockets 20 21, as shown in Fig. 6, render said devices inoperative, and when pulled outwardly from pockets 20 21, render such devices operative or effective, the object being to enable the officer in charge to quickly change the restrictions according to the rights of the different voters. That is to say, in instances where, for example, both men and women are voting at the same machine, the officer in charge by means of handles 22, can at will adjust the machine and regulate the restricting devices to suit the sex of the person about to vote, by pushing one handle 22 into its pocket and pulling the other handle 22 out.

The above will give a general idea of the machine and the manner in which it is used. I will now describe in detail the specific construction herein shown.

The keys 5 of each vertical row are mounted in channel-like bars 23, Figs. 1 and 7, which constitute part of the frame of the machine. At its inner end each key is provided with a pin 24, Figs. 3, 5, 6 and 7, engaging a slot in one of the arms of a bell crank lever 25. The other arm of each bell crank 25 is connected at 26 by a pin and slot with one of a vertical stack of main type bars 27, there being one bar 27 connected through each bell crank 25 with each of the keys 5. These type bars 27 carry at their right hand ends the names of the candidates in lines of type 28, and since there are one hundred and twenty keys to the machine, there are one hundred and twenty of the main bars 27 which may be termed the "vote" type bars. There are also two additional or supplemental type bars, one indicated at 29, Fig. 14, being at the top of the stack, and the other 30 being at the bottom of the stack. The bar 29 may carry in type 31 the name of the town, the ward and the precinct, while the bar 30 may carry in type 32 the date of the election. The bell crank levers 25 are pivoted loosely on fixed rods 33 forming part of the frame work of the machine and to these rods 33 are also fixed two plates 34, Figs. 2 and 14, between which all of the type bars 27, 29 and 30 are arranged so as to permit only of endwise movement of said bars. To assist in holding the type bars in place, a bar 35 is fixed at its ends to the plates 34 against which said bars are held by three slides 36, 37 and 38, each extending at its ends through slots 39, Fig. 6, provided in plates 34 so that said slides 36, 37 and 38 can be shifted bodily sidewise and endwise for the purpose described later. Near their right hand ends, Fig. 5, all of the type bars extend between two vertical guide bars 40 rigidly fastened at their ends to brackets 41 that are in turn rigidly fastened to the frame of the machine. The right hand end of each type bar is provided with two lugs 42, Fig. 5, which coöperate with bars 40 to limit the movement of the type bars to the left, and with two locking bars or slides 43 and 44. The locking bar 43 extends through and is guided by slots 45 in plates 34 and is connected at each end by a pin and slot with one arm of a bell crank lever 46, while the locking bar 44 extends through and is guided by slots 47 in plates 34. The bar 44 is connected at each end by a pin and slot with one arm of a bell crank lever 48. The levers 46 and 48 at the upper ends of bars 43 and 44 are connected by pins and slots with one end of a slide 49, Fig. 7, mounted on the top of the upper plate 34.

Referring to Fig. 6, the slide 49 is reciprocated by a cam 51, the cam having a groove and the slide being provided with a roll 50 which occupies the cam groove. Referring now to Fig. 7, it will be apparent that when the slide 49 is moved to the right, the bell-crank levers 46 and 48 will be actuated so as to separate the two locking bars 43 and 44. When the locking bars are thus separated sufficient space is provided for the passage back and forth of the lugs 42 on the type bar 27, see also Fig. 5, in which the left hand position of the lugs 42 is represented by solid lines, and the righthand position represented by dotted lines, said positions being respectively on opposite sides of the locking bars. The two bell-crank levers 46 and 48 at the lower ends of bars 43 and 44 are likewise connected with a slide 49, which is actuated by an individual cam 51, the two cams 51 being affixed to a vertical shaft 52 suitably journaled in the frame of the machine. The two cams cause the two slides 49 to reciprocate in unison.

It will be clear from the above that, when a voter presses in one of the keys 5, the bell crank lever 25 connected with that key acts to shift its type bar 27 to the right so that the lugs 42 are carried past locking bars 43 and 44 and the type 28 are shifted into printing position as indicated by dotted lines in Fig. 5, and this is true of the type bar of every key that is operated, that is, their printing ends are all shifted into printing position with lugs 42 to the right of locking bars 43 and 44 when their keys are operated.

The handle 12 that is operated by the officer in charge of the machine after each voter leaves the latter, as above described, is fixed to a shaft 53 connected at its inner end by bevel gears 54 with shaft 52, and therefore when said handle is operated to the extent of one revolution, a movement of one revolution is imparted to shaft 52 which acts through cams 51, slides 49, and levers 46 and 48, to shift locking bars 43 and 44 toward each other between the lugs 42 of the type bars that have been shifted to the right and the lugs 42 of those that have not been shifted. In this manner the unshifted type bars are locked in their normal positions while the shifted type bars are locked with their characters in printing position, said characters being thereafter inked and their impression made upon the ballot strip of which the section 11, Fig. 1, is part, all of which occurs, approximately, during the first half of the revolution of shaft 52. During the last half of the revolution of shaft 52, the parts are all restored to normal condition with a fresh section of the ballot strip opposite the opening 10, Fig. 1, as will be described later.

Behind the stack of type bars 27, 29 and 30, and freely mounted in slots in plates 34 is a slide 54', Figs. 5 and 6, made with two arms 55 each equipped with a roll 56 in engagement with a cam 57 on shaft 52. Cams 57 are shaped and timed to shift slide 54 to the left, Fig. 5, and back to its first position again during the last half of the revolution of shaft 52 after the impression has been made upon the ballot strip and the locking bars 43 and 44 have been moved apart by cams 51. During this movement of slide 54', the latter engages the rear ends of the shifted type bars and returns the latter to normal position. For this reason, every one of the type bars is provided with a rearwardly projecting lug 58 to be engaged by slide 54'.

Journaled in the side plates 34 in front and near the left hand end of the stack of type bars is a rock shaft 59 provided with two arms 60, one near each end thereof, which carry a rod 61, Figs. 2, 3 and 5, occupying a position in the path of lugs 62 provided on the front of type bars 27. The two type bars 29 and 30, instead of being provided with lugs like 62, are provided with hooks 63 that are always in engagement with bar 61. Therefore it will be clear that, when any type bar 27 is shifted to the right, Figs. 3 and 5, its lug 62 will swing bar 61 with it, thus carrying the two type bars 29 and 30 into printing position with the first bar 27 that is shifted into that position, the type bars 29 and 30 thus being connected with all of the keys 5, while each type bar 27 is connected through one of the bell cranks 25 with a separate key 5.

Projecting from the rock shaft 59 is an arm 64, Fig. 2, to which is pivotally connected one end of a rod or link 65 whose other end extends loosely through a block 66 pivotally connected with one of the arms of a bell crank lever 67 pivoted on the frame of the machine. The bell crank 67 has its other arm connected by a link 68, Figs. 2, 18 and 19, with a ring-shaped slide 69 mounted on the frame of the machine. This slide 69 surrounds shaft 53 alongside of a ratchet wheel 70 fixed to said shaft, and is held in place by screws 71 projecting through vertical slots 72 provided in said slide. Normally a spring 73 holds slide 69 elevated with a shoulder 74 on said slide in the path of a stud 75 projecting from ratchet wheel 70 so that shaft 53 is locked against movement in the direction of the arrow, Fig. 19. Movement of shaft 53 in the opposite direction is always prevented by a pawl 76 that is in engagement with ratchet wheel 70.

When rock shaft 59 is turned as above described it acts through link 65, bell crank 67 and link 68 to pull slide 69 down so as to carry the shoulder 74 out of the path of stud 75 thus leaving shaft 53 free to be rotated by the officer in charge, as above described. As shaft 53, rotating in the direction of the arrow, Fig. 19, nears the end of one revolution, a second stud 77 projecting from ratchet wheel 70 engages a cross bar 78 formed as part of slide 69, and raises the latter positively to its upper position, thus bringing shoulder 74 back into the path of stud 75 and preventing shaft 53 traveling beyond one revolution. The link 65 extends loosely through block 66 to allow said link to move back to normal position when type bars 29 and 30 are restored to normal position by slide 54', there being an adjustable abutment 79 on link 65 to engage block 66 when said link is moved to the left, Fig. 2, as above described. The cross bar 78 of slide 69 is offset with relation to shoulder 74 as viewed in Fig. 18, and stud 75 is made shorter than stud 77 so that the former does not engage cross bar 78 but passes behind it during the revolution of shaft 53. Also, at the time that pin 77 passes shoulder 74, the latter is below and out of the path of the former. On the rock shaft 59 there is provided a second arm 80 connected by a link 81 with the operating arm 82 of the counter 19 so that each oscillation of rock shaft 59 is recorded by counter 19 so as to indicate the total number of ballots cast.

From the above, it will be clear that the lug 62 of the first type bar 27 that is shifted into printing position through the operation of its key 5, acts through rod 61 to shift type bars 29 and 30 into printing position at the same time, while the movement imparted to rock shaft 59 acts through links 81 and 65 to operate counter 19 and free handle 12. The slide 36, Figs. 2 and 5, extends at its ends through slots 39 in plates 34 and at its lower end is connected by a link 83 with one end of a lever 84 fulcrumed on the frame of the machine. To the other end of lever 84 is pivotally connected the inner end of a handle 13 that extends through a pocket 85 to the exterior of the machine. The outer end of handle 13 is a hinged ring and when the handle 13 is pushed inwardly to the limit of its movement with the ring folded down into pocket 85, and a cover 86 swung into position over the end of the handle, the latter and slide 36 are locked firmly against movement. Slide 36, at each end, is made with a diagonal slot 87, through which projects a stud 88, Figs. 2 and 6, rigidly fixed to the plate 34. Thus, when the handle 13 is operated to shift the lower end of slide 36 sidewise, the diagonal slot 87 at the lower end produces a simultaneous endwise movement which causes the slot 87 at the upper end to shift the upper end of slide 36 sidewise in unison with the sidewise movement of its lower end. The purpose of the cam-slots 87 and studs 88 is, therefore, simply to permit of operating the slide 36 from one end only. In Fig. 2, the slide 36 is shown in its inoperative position which it occupies while the machine is in use, but when handle 13 is shoved inwardly, slide 36 is shifted to the left, Fig. 2, into engagement with lugs 62 so that all of the type bars are locked against movement, and such is the condition while the machine is not in use or is being transported.

The slides 37 and 38 constitute part of the vote-restricting means and are substantially the same in construction as slide 36. The bar 37 at its lower end is embraced by a slide 89 mounted on the lower plate 34. This slide 89 is connected by a link 90 with a handle (like the handle 13 of Fig. 2) that is inclosed by a pocket 21. The slide 38 at its upper end, Fig. 2, is embraced by a slide 91 fastened to the upper plate 34 by a screw 92 extending through a slot 93 in slide 91. This slide 91 is connected by a link 94 with the handle 22, Fig. 6, located in pocket 20. The slides 37 and 38 are for use only in cases where two classes of voters are casting ballots, as, for example, where men and women are voting at the same machine. When the voting is not mixed, then both slides occupy the inoperative positions shown in Fig. 2, unless it is desired to render some of the keys inoperative. When mixed voting is to take place, the type bars representing the questions or candidates to be voted upon by the women each has applied to it an abutment 95, Figs. 3 and 4, made in the form of a spring clip having a lug 96 to be inserted in either of two sockets 97 or 98 provided in every type bar 27, and a spring tail 99 to hold lug 96 in the socket by engaging the opposite side of the type bar. The socket 97 is located on the type bars 27 so that, when lug 96 is in socket and slide 37 is shifted to the left, Figs. 2 and 3, the type bar is locked against movement by the engagement of the abutment with the slide, but so long as slide 37 occupies its inoperative position, the type bar is free to be operated. The socket 98 is located on the type bar so that, when lug 96 is shifted to socket 98, the abutment 95 occupies an inoperative position with relation to slide 37 however the latter may be adjusted. It will thus be seen that when a male voter follows a female voter, the slide 37 is moved from its inoperative to its operative position, and, by its engagement with abutments 95, prevents the male voter from operating those type bars used by the female voters. It is as necessary, of course, when mixed voting is taking place, to lock the type bars used by the male voters while a female voter is casting a ballot, and for this reason every type bar 27 is provided with another pair of sockets 100 and 101 to receive abutments 95, but as will be obvious, these abutments 95 will only be placed in operative position on those type bars used by the male voters. Those abutments 95 in engagement with the sockets 100 coöperate with the slide 38 in the same manner that the abutments in sockets 97 coöperate with slide 37. It will now be clear that, when the abutments 95 and slides 37 and 38 are employed, the capacity of the machine may be quickly varied to suit the privileges of the voter by shifting one of the slides 37 or 38 into operative position and the other out of operative position.

The party keys as Republican, Democrat, or the like, can, by my present invention, each include a group of any number of keys arranged either in vertical or horizontal rows or partial rows, and it is made impossible, whether the party keys be in horizontal or vertical rows, for a voter to operate more than the proper predetermined number of type bars in each group. That is, whatever grouping arrangement is employed, either vertical or horizontal, a voter cannot vote for more than the proper number of candidates in any one group. To this end, I have herein provided two vote-controlling devices, one for limiting the number of keys that can be operated in any vertical row or group of vertical rows, and one for limiting the number of keys that can be operated in any horizontal row or group of horizontal rows, either of which devices may be used to the exclusion of the other. These two devices are constructed as follows: Behind the stack of type bars is a vertical plate 102, forming part of the frame of the machine, to which is fastened a bar 106 on which is mounted a row of wedge-shaped key and type bar controlling blocks 105 which are forked so as to straddle said bar. There are one hundred and twenty of these blocks 105, each connected through two links 104, and a lever 111 with a bell crank lever 103, and each bell crank lever 103 is connected by a link 109 with one of the type bars 27. The links 109 connect the type bars 27 of the first vertical row of keys 5 with the bell cranks 103 of the first vertical row of bell cranks, which are in turn connected with the first fifteen blocks 105 on bar 106, while the type bars 27 of the second vertical row of keys 5 are connected through links 109 and the second row of bell cranks with the second group of fifteen blocks on bar 106, and since this method of connecting is continued throughout the series of vertical rows of keys, it will be seen that there is a group of fifteen blocks 105 for each vertical row of keys and that the blocks 105 have the same order of arrangement in each group of blocks as their respective keys have in each vertical row of keys. Also, excepting the last vertical row of keys, the block 105 of the bottom key of each vertical row stands alongside the block 105 of the top key of the next succeeding vertical row. Between the upper thin portions of the blocks 105 and mounted on the upper edge of bar 106 are as many filler washers 108 as will allow only a predetermined number of blocks 105 of each group of blocks to be lifted into the space or passage between two removable and longitudinally adjustable pins 107 projecting from bar 106. Therefore, if the two pins 107, Fig. 16, are, for example, so adjusted in sockets 110 provided in bar 106 that the fifteen blocks 105 of one of the vertical rows of keys are grouped between the same, and the number of filler washers is adjusted to permit only two blocks 105 being raised into the passage between pins 107, then only two keys 5 of that vertical row can be operated, although the voter, unless prevented by one of the slides 37 or 38, is free to choose any two keys. It will be understood that as many pins 107 are employed as may be required for the desired grouping of the blocks 105, and that, since the row of sockets 110 extends throughout the length of bar 106, any desired grouping may be secured.

To render inoperative the vote-limiting devices just described, the pins 107 are removed from bar 106, thus leaving all of the blocks 105 free to be operated.

To the back of the fixed bar 35, Figs. 3 and 5, is fastened a bar 113 similar to bar 106, and on this bar 113 is mounted a row of one hundred and twenty blocks 114 like the blocks 105, each directly connected by a link 115 with one of the type bars 27. The same principle is involved in the method of connecting these blocks 114 with the type bars 27 as with the blocks 105, except that the connections between blocks 114 and the type bars are arranged with respect to the horizontal rows of keys 5, while the connections between blocks 105 and the type bars are arranged with respect to the vertical rows of keys 5. It will now be clear that by removing the pins 107 from one bar 106 and applying them to the other bar, either set of blocks may be rendered operative to the exclusion of the other.

Normally occupying a position opposite the ends of the type bars 27, 29 and 30 that carry the printing characters is an ink pad 116, Figs. 11 to 14 inclusive, mounted on an ink pad carrier 117, to each end of which is rigidly secured an arm 118 pivotally mounted on a post 119 projecting from one end of a slide 120. These slides 120 are mounted in ways 121 on the frame of the machine and at the other end of each is a stud 122, Figs. 11 and 17, in engagement with a slot 123 provided in a link 124. Each link 124 is pivoted at 125 to one end of another slide 126 mounted in ways 128 on the frame of the machine. The other end of each slide 126 carries a cam-roll in engagement with a cam 129 fixed to shaft 52. The slots 123 in links 124 are eccentric with relation to pivots 125 and normally pins 122 occupy positions at the ends of said slots that are farthest from pivots 125.

Each arm 118 is made with a lateral extension 130 having in it a slot 131 into which a pin 132 projects. Each pin 132 is carried at one end of a slide 133 and at its other end each slide 133 carries a pin 134 in engagement with an eccentric slot 135 of a link 136 pivoted at 137 to another slide 138 mounted in the ways 128. Each slide 138 is connected by a rod 139 with a crank 140 on shaft 52. During the first half of the revolution of shaft 52, the cams 129 act through slides 120, links 124 and slides 126 to shift ink pad 116 in a straight path toward and against the characters of the type bars that have been moved into printing position and then away from said characters. As the pad moves away from the characters, the cranks 140 acting through slides 133, links 136, slides 138 and rods 139, causes the pin 132 to engage the left hand end of slot 131 and thereby swing ink pad carrier 117 on the post 119 off to one side into the position shown in Fig. 13 so that an impression can be made on section 11 of the ballot strip of characters that have been inked. Thereafter, near the end of the movement of shaft 52, the ink pad carrier 117 is shifted back to its normal position again by pin 132, as shown in Fig. 11. In other words, the mechanism just described acts to first press the ink pad 116 against the type, then to swing the pad carrier 117 aside from in front of the type, and then to swing it back to normal position again. While the ink pad carrier is thus removed from in front of the type occupying printing position that have been inked, the section 11 of the ballot strip 141, Fig. 14, is carried over to said type and pressed against the same, thus printing on said strip the vote just cast.

Each slide 133 is connected by a link 142, Figs. 11, 12, 13 and 14, with an arm 143 pivoted at 144 to the frame of the machine. Each arm 143 is made with a slot 145 through which extends a post 146 that forms part of a slide 147. Each slide 147 is mounted in a T-shaped slot 148 provided in a support 149 that is pivoted at 150 to the frame of the machine. Thus support 149 is capable of swinging on pivot 150 carrying slide 147 with it, while slide 147 is capable of bodily movement on support 149 across pivot 150. Support 149 is normally locked in the position shown in Fig. 11 by a latch 151 on the frame of the machine. When, however, slides 133 are shifted to the left during the first part of the reciprocating movement imparted thereto by cranks 140, they act through links 142 and arms 143 to shift slide 147 rearwardly to the extent illustrated in Fig. 12, whereupon a tail 152 on said slide engages a pin 153 on latch 151 and the latter is disengaged from support 149. The support 149, being thus freed, is then rotated by the continued movement of arms 143 in the direction of the arrow, Fig. 13, until arrested by engagement with a stop block 154 on the frame of the machine. Thereafter the continued swinging movement of arm 143 to the left, shifts slide 147 to the left on support 149 toward the printing ends of the stack of type bars and into the position shown in Fig. 13, which brings the section 11 of the ballot strip against the ends of the type bars that occupy printing position. As the support 149 comes into the position shown in Fig. 13, another latch 155 engages said support and locks it against stop 154. The arms 143 now swing back to their first and normal positions and during the first part of their movement said arms shift slides 147 on supports 149 to the right, Fig. 13, until tails 152 move latches 155 out of engagement with supports 149. Thereafter supports 149 swing on pivots 150 back to their first positions where they are caught and held by latches 151. Continued movement of arms 143 toward their normal positions shifts slides 147 forward on supports 149 back to their normal positions again.

The ballot strip carrier is fixed to slides 147 and therefore partakes of both the rotary and bodily movements of the latter just described, said movements serving to swing the section 11 into printing position, make the impression on section 11 and then return the ballot strip carrier to normal position with a fresh section 11 opposite opening 10. The ballot strip carrier comprises two counterpart heads 156, Figs. 5, 9 and 10, connected by rods 157 and 158 and by a platen 159. In each head 156 is journaled a short shaft 160 made at its inner end with a socket 161 within which is removably secured by a pin 162, one end of a winding roll 163. Upon shaft 160 is fixed a ratchet-wheel 164 carrying a pawl 165 in engagement with another but opposed ratchet-wheel 166 loose on shaft 160. Ratchet wheel 166 is compounded with a pinion 167 also loose on shaft 160, that is engaged by a rack 168 forming part of a slide 169 mounted in ways on head 156. Alongside of and parallel with the ways for slide 169 is a rod 170 fixed to head 156 carrying a spring 171 resting at one end against an abutment 172 on head 156, and at its other end against an arm 173 projecting from one end of slide 169. From the other end of slide 169, a feeler arm 174 projects through a slot 175 in head 156 with its free end bent toward winding roll 163 and held against the windings thereon by spring 171. A detent 176 on head 156 prevents unwinding motion of roll 163. It will now be clear that if slide 169 is reciprocated the oscillations imparted thereby to ratchet 166 will act through pawl 165 and ratchet-wheel 164 to rotate roll 163 and wind the ballot strip 141 thereon, and that as the winding on said roll increases its diameter, the feeler-arm 174 will act to correspondingly reduce the extent of movement of slide 169 with the result that each reciprocation of said slide 169 winds onto roll 163 approximately the same amount of the strip 141 although the diameter of the roll 163 is constantly increasing. In other words, the action of the feeler-arm 174 is to automatically regulate the movements of slide 169 so as to compensate for variations in the diameter of roll 163 due to the addition of windings.

The ballot strip 141 is drawn from a supply-roll 177 fixed rigidly at its ends in sockets 177ˣ, like the sockets 161. The sockets 177ˣ are the inner ends of short shafts 178 journaled in heads 156 and each shaft 178 also carries a brake-wheel 179 frictionally engaged by a strap 180 having its ends fastened at 181 to the head 156. These brake wheels and straps prevent racing of the supply-roll and provide the proper tension for the ballot strip. The ballot strip extends from the supply roll around one of the rods 158, then across platen 159 and around the other rod 158 to the winding roll 163. Upon the outer faces of heads 156 are provided sockets 182 within each of which one of the slides 147 is rigidly but removably held by two spring latches 183 that engage notches 184 provided on the slide 147.

Each slide 169 carries a stud 185 projecting through a slot 186, Fig. 5, in head 156 to coöperate with a latch-like abutment 187 pivotally mounted on the frame of the machine and held in normal position by a spring 188 and stop 189, so that as the ballot strip carrier swings with slide 147 and holder 149 from the position shown in Fig. 12 to the position shown in Fig. 13, the stud can pass said abutment 187 idly, but when the ballot strip carrier is shifted with slide 147 to the right from the position shown in Fig. 13, then abutment 187 engages stud 185 and arrests the movement of slide 169 in that direction while the carrier continues thus compressing spring 171. When latch 155 is disengaged from support 149 and the latter swings back toward its normal position stud 185 is carried away from abutment 187 and spring 171 shifts slide 169 as far back toward its extreme normal position as feeler 174 will permit, thus winding onto roll 163 the ballot just printed and feeding a fresh section 11 of the ballot strip into place on platen 159. The slot 190 in each stop block 154 is for receiving a stud 191 provided on each slide 133 to assist in guiding the latter.

By referring to Figs. 11 and 17, it will be seen that each link 124 constitutes a rigid connection for its slides 120 and 126 while each link 136 constitutes a rigid connection for its slides 133 and 138, and both of the links serve as means through which each slide 126 or 138 imparts motion to its slide 120 or 133, the slide 133, link 136, and slide 138 moving as one and the slide 120, link 124 and slide 126 moving as one. Each link 124 is provided with a stud 192 projecting into a slot 193 provided in a bar 194 pivotally connected to a pair of arms 195 and 196 which support said bar, while the link 136 is provided with a stud 197 projecting into a slot 198 in bar 194. The slots 194 and 198 are parallel with the direction of movement of the slides so that normally the links are held thereby against displacement with relation to the slides. The arms 195 are pivotally connected to the frame of the machine while the arms 196 are rigidly fixed to a rock shaft 199 journaled in the frame of the machine. One end of rock shaft 199 extends through the frame, as shown in Fig. 17, and is squared to be engaged by the socket of a handle (not shown) by which said shaft is turned so as to shift bar 194 into the position indicated by dotted lines in Fig. 11. As bar 194 is shifted into this position, it swings links 124 and 136 with it and the eccentric or cam slots 123 and 135 act through studs 122 and 134 to shift and hold slides 120 and 133 closer to slides 126 and 138, respectively. It will now be clear that if handle 12 is freed and operated after links 124 and 136 have been thus shifted out of normal position, the ink pad 116 and ballot strip carrier 156 will be shifted farther toward the printing ends of the type bars, far enough in fact to press against all of said type bars while they occupy their normal retracted positions, thereby inking the type and producing upon the ballot strip an impression of all of the type bars at once. After this impression has been made, the links 124 and 136 are restored to normal position. It will therefore appear that the purpose of the adjustable links 124 and 136 is to shift the region of movement of the ink pad and ballot strip carrier so that an impression of all of the type bars may be made upon the ballot strip to serve as a record after that strip is removed from the machine. This record impression is made by the proper officer before the face plate 6 has been placed in position or after it is removed, the handle 12 being freed by the officer operating slide 69 by hand.

To the inner end of the stem of each key 5 is pivoted a link 200 which carries at its outer end a stud 201, Figs. 7 and 8, which projects laterally through the slotted counter actuating lever 202 and an L-shaped slot 203 formed in the frame of the machine. When the key is pushed in by a voter, the link 200 is carried with it and the stud 201 is shifted to a position at an angle of the slot 203. The movement thus imparted to stud 201 carries the latter from one end of the slot of the counter-actuating lever 202 to the other without operating said lever so that, if a voter pushes in a key and then immediately pulls that key out again, the type bar connected with that key will be first shifted into printing position and then back to its normal position with the machine in the same condition as before the key was operated. Opposite the slots 203 of each vertical row of keys there is a series of blocks 204 each made with a slot 205, and all of the blocks 204 of each series are fixed to a bar 206 mounted to slide endwise in bearings on the frame of the machine. At its upper end each bar 206 is engaged by an arm 207, all of the latter being fixed to a rock shaft 208 journaled on the frame of the machine. Near its left hand end, Fig. 2, rock shaft 208 has fixed to it an arm 209 carrying a cam roll in engagement with a cam 210 on shaft 52. This cam 210 is so timed that at the very start of the rotation of shaft 52, it depresses arm 209 thus lifting at once all of the rods 206 and their blocks 204. When a voter leaves the machine, the studs 201 of the keys that have been pushed in occupy positions in the slots 205 of their respective blocks 204 while the studs 201 of the keys that have not been operated remain out of engagement with their slots 205. Therefore when the officer operates handle 12 and shaft 52 is operated, the blocks 204, being immediately lifted, carry with them the studs 201 that have been shifted, the links 200 of said studs swinging on the pivots at the inner ends thereof. The studs 201, thus shifted by blocks 204, are carried into the lateral extensions of slots 203 thereby locking their keys against accidental or intentional displacement during the printing operation. The cam 210 is so timed as to lower all of the rods 206 before cam 57, Fig. 5, shifts slide 54 to the left to restore the shifted type bars to normal position. Thus the keys of those shifted type bars will be unlocked by blocks 204 before the type bars are returned to normal position by slide 54. When the blocks 204 are lifted and studs 201 are swung into the lateral extensions of slots 203 at the inner ends of the latter, said studs operate the counter actuating levers 202. It will therefore be clear that the only essential peculiarity of the counters 17 is that they are operated only by the lateral swinging movement of studs 201. Or in other words, the counters 17 are operated by the means which locks the keys and not by or through the keys themselves, the keys serving only as the means through which the counters that are to be operated by the locking means are selected or determined.

Among the advantages to the construction above described is its compactness and comparative simplicity; the voter "writes" his own ballot; the opportunities for fraud or mistakes are eliminated; the machine is quickly and easily operated; the same machine may be used for straight or "mixed" voting; and by having the ballot section 11 normally opposite the opening 10, the voter may write thereon by hand the name or names of such candidates as are not provided on the type bars. Blank and defective ballots, the usual fault of the ordinary methods of voting, are entirely done away with and no voter loses his or her vote through defects of the machine or fault of their own if they vote at all. Also in case a voter desires to restore a shifted type bar to normal position, the same may be quickly accomplished by pulling the depressed push button outwardly. Also in the case of a voter being challenged, the ballot blank opposite opening 10 is exposed so that the challenged voter can write his name thereon as may be required in such cases.

Having thus explained the nature of my said invention and described a way of constructing and using the same, although without attempting to set forth all of the forms in which it may be made or all of the modes of its use, I declare that what I claim is:—

1. A voting machine comprising a plurality of ballot blanks; means to mark said blanks to indicate votes; means controlled by the voter for adjusting the ballot-marking means so as to determine the desired ballot; normally inoperative actuating means beyond the control of the voter for causing the marking of the blank, and means adapted to be actuated by said adjusting means for rendering operative said actuating means when the marking means is adjusted by the voter.

2. A voting machine comprising a plurality of ballot blanks; means to mark said blanks to indicate votes; keys operated by the voter for adjusting the ballot-marking means so as to produce the desired ballot; means to separate the keys into groups and to prevent the operation of more than a predetermined number of the keys of each group; means to render predetermined keys operative or inoperative at will to vary the capacity of the ballot-marking means according to the privilege of the voter; and means to operate the ballot-marking means.

3. A voting machine comprising a plurality of ballot blanks; means to mark said blanks to indicate votes; keys operated by the voter for adjusting the ballot-marking means so as to produce the desired ballot; said keys being arranged in vertical and horizontal rows; a set of key-controlling blocks arranged side by side in a row and connected with the keys so that the blocks of each vertical row of keys are grouped together; means to provide a passage adjacent each group of blocks into which the latter are shifted when the keys are operated, said means providing for restricting said passage so as to receive only a predetermined number of blocks less than the number of blocks in the respective group with which each coöperates; a second set of key-controlling blocks arranged side by side in a row and connected with the keys so that the blocks of each horizontal row of keys are grouped together, and means to provide a passage adjacent each group of blocks into which the latter are shifted when the keys are operated, said means providing for restricting said passage so as to receive only a predetermined number of blocks less than the number of blocks in the respective group with which each coöperates.

4. A voting machine comprising a plurality of ballot blanks; means to mark on a blank a plurality of marks to indicate votes for a plurality of candidates for different offices; keys adapted to be operated by the voter for adjusting the ballot-marking means so as to determine the desired candidates; means to operate the ballot-marking means to record the marks for the selected candidates, and means to hold said ballot-marking means in ballot-marking position while a ballot is being marked.

5. A voting machine comprising a plurality of ballot blanks; means to mark said blanks to indicate votes; keys operated by the voter for adjusting the ballot-marking means so as to produce the desired ballot; means to operate the ballot-marking means, and means adapted to place in ballot-marking position marking means incompletely adjusted by the voter and to lock the marking means in ballot-marking position while a ballot is being marked.

6. A voting machine comprising a plurality of ballot blanks; means to mark said blanks to indicate votes; keys operated by the voter for adjusting the ballot-marking means so as to produce the desired ballot; a plurality of counters one for each key; counter-actuating means from which the counters are normally disconnected; means through which each key connects its counter with the counter-actuating means when said key is operated to adjust the marking means, and means to operate the ballot-marking means.

7. A voting machine comprising a plurality of ballot blanks; means to mark said blanks to indicate votes; keys operated by the voter for adjusting the ballot-marking means so as to produce the desired ballot; a plurality of counters one for each key; counter-actuating means from which said counters are normally disconnected; means through which each key connects its counter with the counter-actuating means when said key is operated to adjust the marking means; a ballot counter, and means to operate the ballot-marking means and ballot counter.

8. A voting machine comprising a plurality of type bars representing different candidates, said bars being movable to and from printing position; means to ink the type on said bars; means adapted to be operated by the voter for shifting a plurality of type bars representing a plurality of candidates into printing position; a plurality of ballot blanks; means to feed the blanks one at a time into position to be printed upon; and means to effect the printing operation.

9. A voting machine comprising a plurality of type bars normally occupying inoperative positions; means to ink said bars; means controlled by the voter for shifting the type bars into printing position; a member for locking predetermined type bars in inoperative position; means to render said member operative or inoperative at will; a plurality of ballot blanks; means to feed the blanks one at a time into position to be printed upon by said bars, and means to effect the printing operation.

10. A voting machine comprising a plurality of type bars normally occupying inoperative positions; means to ink said bars; means controlled by the voter for shifting the type bars into printing position; a pair of members each for locking a separate set of type bars in inoperative position; means to render said members operative or inoperative at will; a plurality of ballot blanks; means to feed the blanks one at a time into position to be printed upon by said bars, and means to effect the printing operation.

11. A voting machine comprising a plurality of type bars normally occupying inoperative positions; means to ink said bars; means controlled by the voter for shifting the type bars into printing position; means to prevent the voter from shifting more than a predetermined number of type bars; a plurality of ballot blanks; means to feed the blanks one at a time into position to be printed upon by said bars, and means to effect the printing operation.

12. A voting machine comprising a plurality of type bars normally occupying inoperative positions; means to ink said bars; means controlled by the voter for shifting the type bars into printing position; a plurality of ballot blanks; means to feed the blanks one at a time into position to be printed upon by said bars; means to effect the printing operation, and means to lock the type bars against being shifted while the printing is being effected.

13. A voting machine comprising a plurality of main type bars normally occupying inoperative positions; one or more supplemental type bars normally occupying inoperative positions; means to ink the type bars; means controlled by the voter for shifting a selected number of main type bars into printing position; means through which the shifting of any main type bar into operative position shifts the supplemental type bars into operative position also; a plurality of ballot blanks; means to feed the blanks one at a time into position to be printed upon by said bars, and means to effect the printing operation.

14. A voting machine comprising a plurality of type bars normally occupying inoperative positions; means to ink the type bars; means controlled by the voter for shifting the type bars into printing position; a plurality of ballot blanks; means to feed the ballot blanks one at a time into position to be operated upon; and means to impress the characters of the shifted type bars upon the blank that is in position to be operated upon, provision being had to adjust the impression effecting means so that it may be employed to secure an impression of all of the type bars while the latter are in normal positions.

15. A voting machine comprising a closed box; ballot-marking mechanism within said box; keys upon the exterior of the box through which the voter adjusts the ballot-marking mechanism according to the desired ballot; ballot blanks within said box; a blank carrier within said box; an aperture in the box exposing the blank on said carrier which is to be marked, and means for operating the blank carrier to present said blank to the marking mechanism for feeding another blank into marking position on said carrier and for restoring the machine to normal condition with the fresh blank opposite the aperture in the box.

16. A voting machine comprising a plurality of type bars normally occupying inoperative positions; means to ink the type bars; means controlled by the voter for shifting the type bars into printing position; a plurality of ballot blanks; normally inoperative means for impressing the characters of the shifted type bars upon one of the blanks, and for restoring the machine to normal condition with another blank in position to be operated upon; and means through which the shifting of a type bar renders the said impression-effecting and restoring means operative.

17. A voting machine comprising a closed box; ballot-marking mechanism including shiftable type bars within said box; keys upon the exterior of said box through which the voter adjusts the ballot-marking mechanism according to the desired ballot; ballot blanks within said box; mechanism within said box for impressing the characters of the shifted type bars upon one of the blanks and for restoring the machine to normal condition with another ballot blank in position to be operated upon; a normally inoperative member upon the exterior of the box for operating said mechanism, and means through which the shifting of a type bar renders said member operative.

18. In a voting machine, in combination, a carrier for ballot blanks; a rotatable support on which said carrier is slidably mounted; a wall adjacent the carrier made with an aperture opposite the carrier, whereby a portion of the blank is exposed to the voter; ballot-marking devices alongside said carrier, and means to rotate the support and slide the carrier thereon to effect an impression by the marking devices.

19. In a voting machine, in combination, a carrier for ballot blanks; a rotatable support on which said carrier is slidably mounted; a wall adjacent the carrier made with an aperture normally opposite the carrier; ballot-marking devices alongside said carrier; means to rotate the support and slide the carrier thereon to shift the latter to and from the marking devices; means to lock the support after it has been swung to shift the carrier in either direction, and automatic means to unlock the support when the latter is to be swung to shift the carrier in either direction.

In testimony whereof I have affixed my signature, in presence of two witnesses.

FREDERICK A. SUCK.

Witnesses:
F. R. RENLSTONE,
P. W. PEZZETTI.

Copies of this patent may be obtained for five cents each, by addressing the "Commissioner of Patents, Washington, D. C."